Nov. 14, 1939.   S. MINNECI   2,180,164

REGULATOR CIRCUIT

Original Filed March 16, 1937   2 Sheets-Sheet 1

Inventor:
Salvatore Minneci,
by Harry E. Dunham
His Attorney.

Inventor:
Salvatore Minneci,
by Harry E. Dunham
His Attorney.

Patented Nov. 14, 1939

2,180,164

UNITED STATES PATENT OFFICE 2,180,164

REGULATOR CIRCUIT

Salvatore Minneci, Pittsfield, Mass., assignor to General Electric Company, a corporation of New York Application March 16, 1937, Serial No. 131,199
Renewed March 2, 1939

17 Claims. (Cl. 171—119)

My invention relates to regulator circuits and it has for its object the provision of a simple, reliable and inexpensive voltage-responsive, time-delay circuit for automatic voltage regulators.

Most automatic voltage regulators for dynamo-electric machines and for feeder circuits are controlled by sensitive control devices or relays. These devices function to close one set of contacts when the voltage rises slightly above its predetermined normal value and to close a separate set of contacts when the voltage falls slightly below the predetermined normal value. In order that a single device may be sufficiently sensitive for this purpose, it must be made with the same care and precision as are required in the manufacture of delicate voltage measuring instruments. In fact such voltage regulating control relays are often referred to in the art as contact making voltmeters. There is some reason for this name because if a movable contact of a contact-making voltmeter is provided with a pointer for cooperating with a properly calibrated scale, the device will be equally, if not more, sensitive and accurate than a standard voltmeter. Its pivoted contact arm is mounted in jewel bearings, means are provided for minimizing temperature responsive variations in pressure on the bearings and many other refinements found only in precision instruments are employed.

In accordance with my invention, I provide a voltage-sensitive controlling means for electrical regulators which may be just as sensitive as a contact-making voltmeter but which utilizes simple, inexpensive and rugged standard relays or contactors. These relays are normally relatively insensitive but by means of my circuit two or more of these relays are so combined that they reset each other so that, for example, each relay is sensitive only to a particular drop-out or pull-in value of voltage and no one relay need be sensitive to both drop-out and pull-in values. These relays are combined with a time-delay element or relay of any suitable form so as to provide a desirable sensitively controlled time delay regulator characteristic.

My invention will be better understood from the following description taken in connection with the accompanying drawings and its scope will be pointed out in the appended claims.

Figure 1:
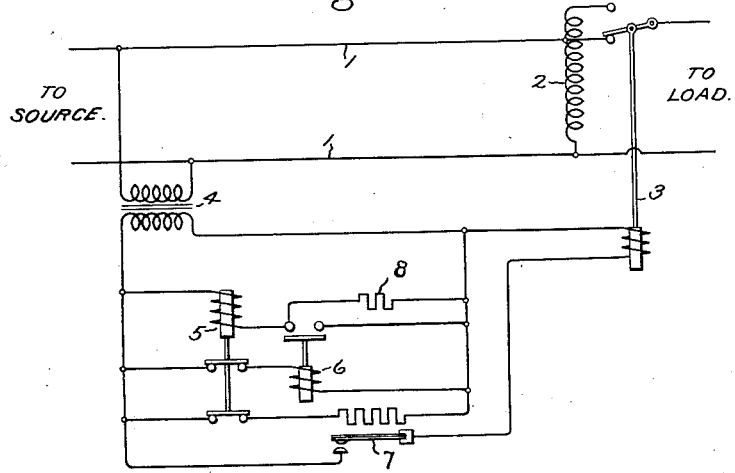
Figure 2:
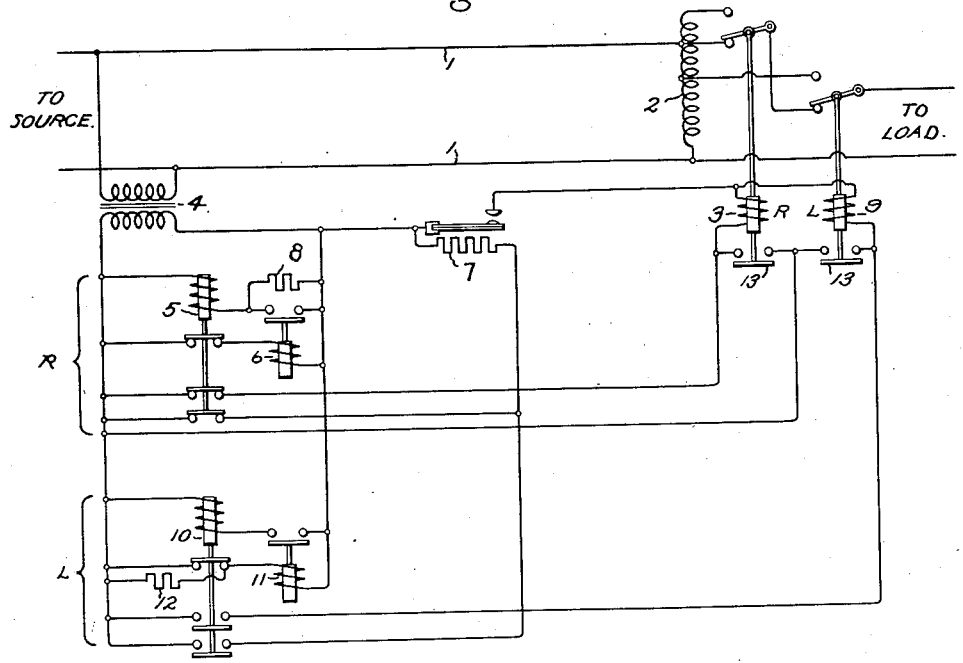
Figure 3:
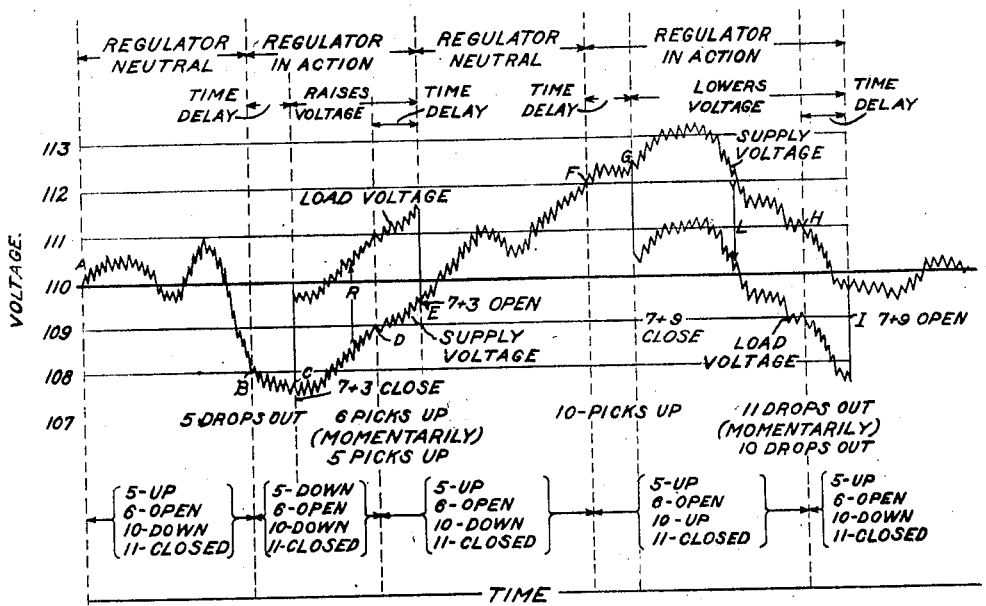
Figure 4:
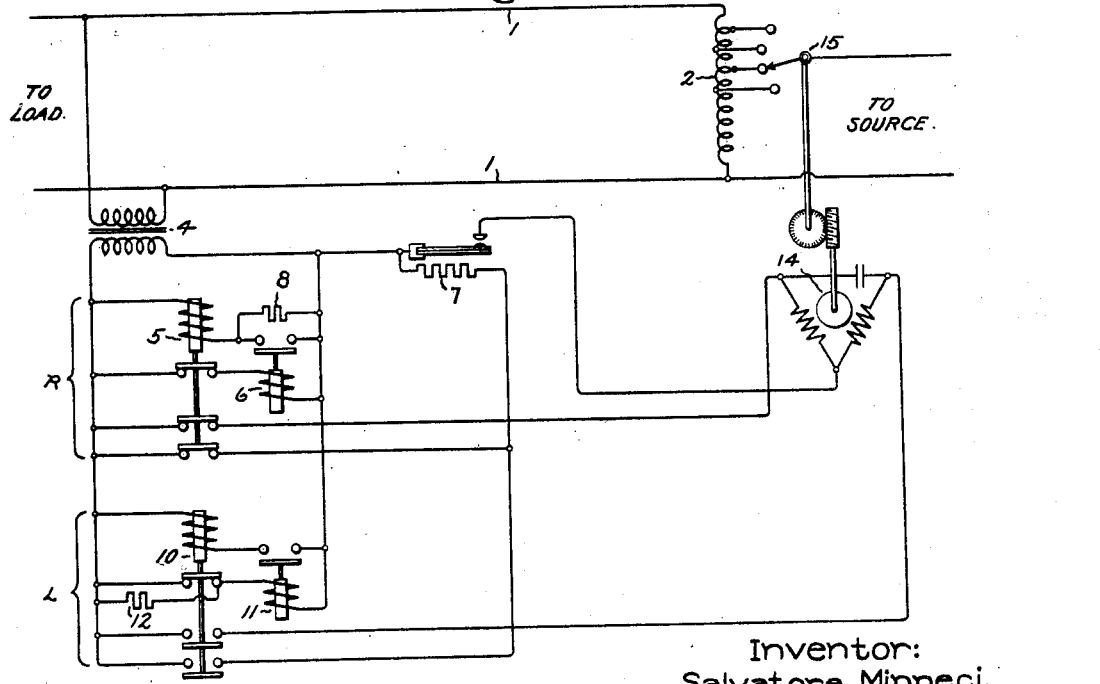

In the drawings, Fig. 1 illustrates a simplified embodiment of my invention as applied to an automatic one-step booster regulator, Fig. 2 is a modification of Fig. 1 in which more elaborate control circuit is used to control a two-step tap-changing regulator, Fig. 3 is a diagram for illustrating the operation of Fig. 2, and Fig. 4 is a modification of Fig. 2 wherein the same control circuit is utilized to control a motor-operated transformer tap-changing regulator.

Referring now to Fig. 1, the main element of this circuit is a section 1 of an alternating current circuit, such for example as a feeder circuit of an electrical distribution system. Inserted in circuit 1 is an auto-transformer 2 which is adapted to have its voltage ratio controlled by means of a contactor 3. In the position shown in the drawings, the contactor 3 is in what may be described as its no-boost position in that it connects the auto-transformer in such a manner that its voltage ratio is unity and no voltage change is produced in the circuit 1. If, however, the contactor 3 is energized so that it moves to its other position a predetermined amount of voltage boost will be inserted in the circuit 1 by the auto-transformer.

A potential transformer 4 connected across the supply side of the main circuit 1 provides energy at a suitable voltage for operating an automatic control circuit for contactor 3. This control circuit contains a master voltage-raising relay 5, a resetting relay 6 for the master relay and a time delay relay 7. These three relays may be of standard design and construction. The master relay 5 is continuously connected across the secondary winding of potential transformer 4 through a resistor 8 which is adapted to be short-circuited by the contacts of resetting relay 6. Relay 6, in turn is energized by the potential transformer 4 through a first set of contacts on the master relay 5. A second set of contacts on the master relay control the connection of the operating element of the time delay relay 7 to the secondary winding of the potential transformer 4.

Time delay relay 7 is shown by way of example as comprising a resistance heater adjacent to which is mounted a bimetallic strip carrying a movable contact. When the heater is deenergized, the bimetallic strip opens the relay contacts and when the heater is energized the heating of the strip causes it to bend in a well-known manner until the contacts close.

The operation of Fig. 1 is as follows:
The relays are illustrated in the positions they assume when the entire system is deenergized. Assume now that circuit 1 is energized from any suitable source of supply (not shown) and that the voltage is rising. Relay 6 is proportioned to pick up and close its contacts at a predetermined voltage value, such for example as 109 volts. If the voltage does not reach 109 before the period of operation of the time delay relay 7, this latter relay will close thereby energizing contactor 3 and causing it to go to its voltage boosting position.

If and when the voltage reaches 109, relay 6 closes and short-circuits resistor 8. This produces a relatively large increase in the energization of master relay 5 whereupon this relay immediately picks up. The opening of the first set of contacts on master relay 5 deenergizes the relay 6, while the opening of the second set of contacts on master relay 5 deenergizes the time delay relay 7. The result is that relay 6 closes only momentarily and that after a predetermined time the time delay relay 7 opens and the contactor 3 drops out to its neutral or no-boost position.

Resistor 8 is of such value that master relay 5 will drop out at a value of voltage slightly below the voltage at which relay 6 picks up. For example, this voltage may be 108. If and when the voltage falls to this value, the dropping out of relay 5 will cause the simultaneous reenergization of the relay 6 and the time delay relay 8 which after a predetermined time will close and again cause the contactor 3 to go to its boosting position.

From the above description, it will be seen that whenever the voltage is above 109 volts for a predetermined time the booster goes to its no-boost position, while whenever the voltage is below 108 volts for a predetermined time the booster goes to its boosting position.

It will also be noted that the only critical or definite adjustment of relay 6 is its pick-up or closing adjustment and its inherent drop-out value may be indefinite and widely different from its pick-up value without in any way affecting the operation of the circuit because the master relay 5 resets the relay 6 by opening its circuit every time the relay 6 picks up. Similarly, the only definite or critical adjustment of master relay 5 is its drop-out adjustment because the relatively great increase in its energization caused by the short-circuiting of resistor 8 will cause positive pick-up regardess of any normal difference between pick-up and drop-out values.

The time delay relay serves to prevent unnecessarily frequent operation of the main current switching contactor 3 as a result of momentary fluctuations in voltage. Thus, only the relatively long continued voltage variations which ordinarily require correction will be compensated for by the booster.

Ordinarily it is desirable to have the drop-out voltage value of master relay 5 relatively close to the pull-in voltage value of relay 6 in order that the circuit be adequately sensitive. It is also usually desirable to have the magnitude of the single step of voltage boost produced by the transformer 2 greater than the difference between the drop-out and pull-in values of the relays 5 and 6 respectively, in order that a reasonable regulating range may be secured. Under these conditions, it is preferable to have the potential transformer 4 connected to the supply side of transformer 2 and to have the load connected to the opposite side of this transformer for otherwise hunting of the regulating circuit will result. However, under conditions requiring a sensitivity less than the magnitude of the single step of voltage boost, the supply and load ends of the circuit 1 may be safely reversed.

Fig. 2 differs from Fig. 1 mainly in the addition of means for positively lowering the load voltage in case it is too high. This means consists of a voltage lowering contactor 9, a master voltage responsive lowering relay 10 and a resetting voltage responsive lowering relay 11.

The raise and lower contactors 3 and 9 are so connected that when they are both deenergized, the load current flows through the two lowermost main contacts of each of these contactors in series to a neutral tap on the transformer 2. When contactor 3 picks up, the voltage is boosted by a predetermined amount in a manner similar to that shown in Fig. 1. If now the contactor 9 is picked up while the contactor 3 is dropped out the load circuit is connected to an intermediate tap on the auto-transformer 2, thereby positively reducing the load voltage. This arrangement is disclosed and claimed in an application of Frederick F. Brand, Serial No. 183,661, filed January 6, 1938 and assigned to the assignee of the present application.

Master relay 10 is connected to be energized by the potential transformer 4 through the contacts of resetting relay 11. The master relay 10 is so constructed or adjusted that it will pick up at a definite maximum voltage, for example, 112 volts. Resetting relay 11 is energized by the potential transformer 4 through a resistor 12 which is so selected that relay 11 will drop out at a value of voltage slightly lower than the voltage at which master relay 10 picks up. For example, this drop out value for resetting relay 11 may be 111 volts. The resistor 12 is adapted to be short-circuited by a first set of contacts on the master relay 10 so as to secure positive pick up or resetting of relay 11 regardless of its normal pick up value. A lowermost set of contacts on the master relay 10 is connected in series with the heater of the timing relay 7 across the potential transformer 4. These lowermost contacts are also in parallel with the lowermost set of contacts on the master voltage raising relay 5.

In order that the same time delay relay 7 may control both the raise and lower contactors 3 and 9, auxiliary intermediate contacts are provided on both the master raise relay 5 and the master lower relay 10. These intermediate sets of contacts on the master relays have to be closed coincidentally with the closure of the time delay relay 7 for the respective actuation of the contactors 3 or 9, but auxiliary seal-in contacts 13 on these relays hold them picked up after the intermediate contacts on the master relays open. In this manner, the drop out of the contactors is controlled exclusively by the opening of the contacts of the time delay relay 7.

The operation of Fig. 2 can best be understood by reference to the diagram shown in Fig. 3. In this figure voltage is plotted against time. The legends above the voltage curve describe the operation in terms of results or what the regulator as a whole is doing at any particular time and voltage. The legends below the curve describe the operation in terms of how it works or what the positions of the various relays and contactors are at any time and voltage.

While it is unnecessary to duplicate here the information contained in Fig. 3, the main points of the operation are as follows:

Between points A and B the voltage is fluctuating within a normal band between 112 volts and 108 volts. At B the voltage falls below 108 volts whereupon relay 5 drops out. At time C the time delay relay closes causing the load voltage to be raised. At D the supply voltage reaches 109 whereupon the relay 6 picks up momentarily and causes relay 5 to drop out. At E the time delay relay 7 opens causing the regulator contactor 3 to go to its neutral or no-boost position. At F the voltage reaches 112 whereupon master lowering relay 10 picks up. At time G the time delay relay closes causing the regulator to lower the load voltage. At H the control voltage reaches 111 whereupon resetting relay 11 drops out momentarily and causes the master relay 10 to drop out. At time I the time delay relay opens and restores the regulator to its neutral position.

For ordinary sensitivity of the settings of the control relays and ordinary magnitudes of voltage raise and lower it is best that the supply circuit be energized from its left-hand end and the load be connected to its right-hand end in order to eliminate the danger of pumping or hunting.

In Fig. 4, the control relays are exactly the same as in Fig. 2, but a reversible servo motor 14 replaces the raise and lower contactors 3 and 9. This motor is connected by means of suitable gearing and linkages to drive a ratio adjusting switch 15 for the transformer 2.

The operation is similar to that of Fig. 2 except that (1) the intermediate contacts on the master raise relay 5 and the master lower relay 10 control circuits for causing the motor 14 to operate in such directions as to raise and lower the voltage respectively, and (2) the time delay relay does not delay the stopping of the motor.

Because the number of voltage steps obtainable by the ratio changing switch 15 may be made relatively numerous so that each voltage step is relatively small in magnitude, it is practicable to connect potential transformer 4 across the load side of the circuit and in this way secure closer regulation.

While no seal-in means is shown for the motor control circuit, it should be understood that conventional seal-in switches used on motor-operated transformer tap changing circuits may be provided if desired. Such auxiliary seal-in circuits are usually provided so as to prevent the ratio adjusting switch from stopping in an off or intermediate position. Spring drives are often inserted between elements 14 and 15. When this is done the time delay relay 7 may be omitted as the spring drive inherently provides a time delay.

While I have shown and described particular embodiments of my invention it will be obvious to those skilled in the art that changes and modifications can be made therein without departing from my invention and I therefore aim in the appended claims to cover all such changes and modifications as fall within the true spirit and scope of my invention.

What I claim as new and desire to secure by Letters Patent of the United States is:

1. In combination, an electric circuit, a regulator for varying an electrical condition of said circuit, electroresponsive means for operating said regulator, and a pair of relays responsive to said condition for controlling said means, one of said relays having a definite pick-up value, the second of said relays having a definite drop-out value which is slightly different from said pick-up value, and interconnections between said relays whereby when one of said relays responds to its definite value it insures that the other relay will be in condition to respond to its definite value and when said other relay responds to its definite value it resets the first operated relay.

2. In combination, an electric circuit, electroresponsive means for varying an electrical condition of said circuit, a relay responsive to said condition for controlling the energization of said means, a second relay responsive to said condition for controlling the deenergization of said means, and a common means for delaying the controlling effect of both of said relays on said condition varying means.

3. In combination, an electric circuit, electroresponsive means for varying the voltage of said circuit, a relay responsive to the voltage of said circuit for controlling the energization of said means, a second relay responsive to the voltage of said circuit for controlling the deenergization of said means, and a time delay relay interposed between said means and said two voltage responsive relays.

4. In combination, an electric circuit, a regulator for varying an electrical condition of said circuit, electroresponsive means for operating said regulator, and a pair of relays responsive to said condition for controlling said means, one of said relays having a definite pick-up value, the other of said relays having a definite drop-out value which is slightly different from said pick-up value, interconnections between said relays whereby when one of said relays responds to its definite value it insures that the other relay will be in condition to respond to its definite value and when said other relay responds to its definite value it resets the first operated relay and means for delaying the controlling effect of at least one of said relays on said regulator.

5. In combination, an alternating current circuit, a voltage regulating transformer for said circuit, and a pair of relays responsive to the voltage of said circuit for controlling said voltage regulating transformer, one of said relays having a definite pick-up value, the other of said relays having a definite drop-out value which is slightly different from said pick-up value, and interconnections between said relays whereby when one of said relays responds to its definite value it insures that the other relay will be in condition to respond to its definite value, said interconnections also providing that when said other relay responds to its definite value it resets the first operated relay.

6. In combination, an electric circuit, means for inserting a regulating voltage in said circuit, and a pair of voltage-sensitive relays for controlling said means, one of said relays having a definite pick-up value, the other of said relays having a definite drop-out value, and interconnections between said relays whereby the picking up of the first relay causes the picking up of said other relay, and the picking up of said other relay causes the dropping out of the first relay.

7. In combination, an electric circuit, means for increasing the magnitude of an electrical condition of said circuit, and a pair of relays sensitive to the magnitude of said condition for controlling said means, one of said relays having a definite drop-out value at which it causes said means to raise the value of said condition, the other of said relays having a definite pick-up value at which it causes said means to stop raising the magnitude of said condition, and interconnections between relays whereby the dropping out of the first relay insures that the other relay will be in condition to respond to its definite pick-up value and when said other relay responds to its definite pick-up value it resets the first relay.

8. In combination, an electric circuit, means for increasing the magnitude of an electrical condition of said circuit, and a pair of relays sensitive to the magnitude of said condition for controlling said means, one of said relays having a definite drop-out value at which it causes said means to raise the value of said condition, the other of said relays having a definite pick-up value at which it causes said means to stop raising the magnitude of said condition, interconnections between relays whereby the dropping out of the first relay insures that the other relay will be in condition to respond to its definite pick-up value and when said other relay responds to its definite pick-up value it resets the first relay, and means for delaying the effect of the operation of said relay on said means for raising the magnitude of said condition.

9. In combination, an alternating current circuit, a variable ratio transformer for regulating the voltage of said circuit, electrically controlled means for varying the ratio of said transformer, and a pair of relays responsive to the voltage of said circuit for controlling said electrically controlled means, one of said relays having a definite pick-up value, the other of said relays having a definite drop-out value, said definite pick-up value being slightly higher than said drop-out value, and connections whereby the dropping out of the second relay causes the dropping out of the first relay, and further connections whereby the dropping out of the first relay causes the picking up of the second relay.

10. In combination, an electric circuit, a regulator of an electrical condition of said circuit, electroresponsive means for operating said regulator, and a pair of relays responsive to the voltage of said circuit for controlling said electroresponsive means, one of said relays having a definite pick-up value at which said electroresponsive means causes said regulator to lower the value of said condition, the other of said relays having a definite drop-out value at which said electroresponsive means causes said regulator to stop lowering the value of said condition, said definite pick-up value being slightly higher than said definite drop-out value, and connections whereby the picking up the first relay insures that said second relay can drop out at its definite value, and further connections whereby the dropping-out of said second relay causes the dropping-out of said first relay.

11. In combination, an electric circuit, a regulator of an electrical condition of said circuit, electroresponsive means for operating said regulator, and a pair of relays responsive to the voltage of said circuit for controlling said electroresponsive means, one of said relays having a definite pick-up value at which said electroresponsive means causes said regulator to lower the value of said condition, the other of said relays having a definite drop-out value at which said electroresponsive means causes said regulator to stop lowering the value of said condition, said definite pick-up value being slightly higher than said definite drop-out value, connections whereby the picking-up of the first relay insures that said second relay can drop out at its definite value, and further connections whereby the dropping-out of said second relay causes the dropping-out of said first relay, and time delay means for delaying the effect of the operation of said relays on said regulator.

12. In combination, an electric circuit, means for raising and lowering the value of an electrical condition of said circuit, a relay responsive to said condition for causing said means to raise the value of said condition, a second relay responsive to said condition for causing said means to stop raising the value of said condition at a value of said condition slightly above the value at which the first relay operates, a third relay responsive to a value of said condition which is higher than the value at which said second relay operates for causing said means to lower the value of said condition, and a fourth relay responsive to a value of said condition which is intermediate the values thereof at which the third and first relays operate for causing said means to stop lowering the value of said condition.

13. In combination, an electric circuit, a voltage regulator therefor, a relay for causing said regulator to raise the voltage of said circuit when the voltage falls below a predetermined minimum value, a second relay for stopping said regulator from raising the voltage when it rises slightly above said predetermined minimum value, a third relay for causing said regulator to lower the voltage of said circuit when said voltage rises above said predetermined maximum value, and a fourth relay responsive to the voltage of said circuit for stopping the regulator from lowering the voltage of said circuit when said circuit falls slightly below said maximum value.

14. In combination, an electric circuit, a voltage regulator therefor, a relay for causing said regulator to raise the voltage of said circuit when the voltage falls below a predetermined minimum value, a second relay for stopping said regulator from raising the voltage when it rises slightly above said predetermined minimum value, a third relay for causing said relay to lower the voltage of said circuit when said voltage rises above said predetermined maximum value, a fourth relay responsive to the voltage of said circuit for stopping the regulator from lowering the voltage of said circuit when said circuit falls slightly below said maximum value, and means for delaying the controlling effect of said relay on said regulating means.

15. In a regulator system, apparatus having a variable quantity to be regulated, means for controlling the value of said quantity, means responsive to the value of said quantity for operating said controlling means so as to raise and lower the value of said quantity in a manner to maintain said quantity substantially constant, and means including a single time delay device for producing a time delay between the action of said responsive means and the response thereto of said controlling means with respect to both the starting and the stopping of said controlling means for both the raising and the lowering operations thereof.

16. In a regulator system, apparatus having a variable quantity to be regulated, automatic regulating means therefor having an actuated and a deactuated condition, and means including a single electrically actuated time delay relay for producing a prearranged time delay in both the actuation and the deactuation of said regulator.

17. In a regulator system, apparatus having a variable quantity to be regulated, an automatic regulator therefor having two directions of operation, and means including an electrically operated unitary time delay relay for producing a prearranged time delay in the starting and stopping of said regulator in both of its directions of operation.

SALVATORE MINNECI.